United States Patent [19]
Joshi

[11] Patent Number: 5,607,572
[45] Date of Patent: Mar. 4, 1997

[54] REMOVAL OF OXYGEN FROM INERT GASES

[75] Inventor: Ashok V. Joshi, Salt Lake City, Utah

[73] Assignee: Ceramatec, Inc., Salt Lake City, Utah

[21] Appl. No.: 407,813

[22] Filed: Mar. 21, 1995

Related U.S. Application Data

[63] Continuation-in-part of Ser. No. 112,767, Aug. 26, 1993, Pat. No. 5,399,246.

[51] Int. Cl.$^6$ ............................. B01J 20/20; B01D 53/04
[52] U.S. Cl. ............................. 205/763; 205/637; 95/138; 95/148; 423/219
[58] Field of Search ..................... 95/138, 148; 204/129; 423/219; 205/637, 763

[56] References Cited

U.S. PATENT DOCUMENTS

| | | | |
|---|---|---|---|
| 4,734,273 | 3/1988 | Haskell | 423/219 |
| 4,836,929 | 6/1989 | Baumann et al. | 210/638 |
| 5,158,625 | 10/1992 | Lhote et al. | 148/625 |
| 5,219,819 | 6/1993 | Sharma et al. | 502/417 |

Primary Examiner—Arun S. Phasge
Attorney, Agent, or Firm—Trask, Britt & Rossa

[57] ABSTRACT

A method and apparatus for removing oxygen from a crude inert gas containing oxygen as a contaminant is disclosed. The inert gas is passed through a reactor containing an oxidizable material. The reactor is then regenerated via a gaseous reducing agent such as hydrogen. The hydrogen can be generated on site via water or steam hydrolysis.

15 Claims, 2 Drawing Sheets

REMOVAL OF OXYGEN FROM INERT GASES

RELATED APPLICATIONS

This application is a continuation-in-part of U.S. application Ser. No. 08/112,767 filed Aug. 26, 1993 entitled "Inert Gas Purification" by the same inventor and commonly assigned now U.S. Pat. No. 5,399,246. The specification of such prior application is hereby incorporated by reference.

BACKGROUND OF THE INVENTION

1. Field of the Invention

This invention relates to a method and apparatus for removing oxygen from an oxygen containing inert gas such as nitrogen, argon and the like and to particular apparatus useful in said removal at a point-of-use site.

2. State of the Art

Nitrogen, argon and the like are useful inert gases which have many applications such as in the treatment of metals, as inert atmosphere for metal production and heat treatment as well as in various electronic industries, and the like. A major source of $N_2$ as an inert gas is atmospheric air, about 79% of which is $N_2$.

Commercially, large quantities of pure (99.6%) $N_2$ is produced as a valuable product in cryogenic air separation plants for producing oxygen and nitrogen. Crude $N_2$ is also produced by PSA and polymembrane processes, which contain appreciable quantities of oxygen (1000 ppm to 7%). This crude nitrogen stream must be purified to reduce oxygen before it is suitable for use, particularly as an inert gas. The presence of oxygen is detrimental to inert gases generally.

Heretofore, oxygen has been removed from crude inert gases or air streams by catalytic reduction to water with excess hydrocarbons ($CH_4$, $H_2$, etc.) in catalyst beds, referred to herein as the "exothermic process" followed by drying to remove the water.

Although $N_2$ streams purified by this method usually contain low parts per million (ppm) levels of oxygen, the process does have significant drawbacks. First, the hydrocarbon ($CH_4$) used in conventional exothermic processes produces large quantities of $CO_2$ and $H_2O$. Removing all the $CO_2$ and $H_2O$ from such combustion gas is a very expensive process. Secondly, hydrocarbon burning of $O_2$ tends to form $NO_x$ or CO depending on burning conditions, both of which are undesirable products for applications requiring relatively pure $N_2$.

A need in the industry exists to replace the state of the exothermic processes for removing oxygen from nitrogen.

A shortcoming of the cryo/deoxo process for purifying argon is that the water produced from the deoxo reaction must be removed completely before the argon is fed to the final cryogenic distillation column. This requires feeding the argon stream through a dryer preliminary to the cryogenic distillation. Capital and operating costs associated with this additional step add significantly to overall cost. Further, the excess hydrogen introduced to remove the oxygen in the first place must itself be removed and recovered before a pure argon stream can be produced. This adds further to the complexity and cost of the overall design and operation of the process.

A more recent concept for purifying crude argon is disclosed in U.S. Pat. No. 5,035,726, assigned to Air Products. The patent discloses deoxygenating crude argon by use of an oxygen ion transporting membrane, i.e. a solid electrolyte oxygen concentration (SEOC) unit, and then removing nitrogen by returning the oxygen-depleted argon stream to an argon/nitrogen cryogenic distillation unit. Such an argon purification system must necessarily be located close to an argon/nitrogen/oxygen production facility, which is usually a large plant.

Also, the Air Products system involves heating cooled crude argon to the operating temperature of the SEOC unit, which is typically about 700° C. and above, then cooling the oxygen-depleted argon and refrigerating it to a cryogenic distillation temperature (~87.28° K or ~185° C.). Heating and Cooling of the argon gas to such temperature extremes tends to be energy inefficient. Further, the Air Products system contemplates $Bi_2O_3$ as an electrolyte, which is generally unstable under conditions of low $O_2$ concentration, tending then to reduce to electronically conducting bismuth suboxides or even bismuth metal.

Other techniques for purifying argon gas streams have also been suggested. For example, U.S. Pat. Nos. 4,144,038 and 4,477,265 suggest separating argon from oxygen using aluminosilicate zeolites and molecular sieves. Such processes trade argon recovery for purity.

U.S. Pat. No. 4,230,463 suggests using polymeric membranes such as polysulfones, polysiloxanes, polyaryleneoxides, polystyrenes, polycarbonate, cellulose acetate and the like for separating pairs of gases such as hydrogen and argon and polymeric membranes such as polysulfones have been suggested for the removal of oxygen from argon. Studies of hybrid processes involving cryogenic distillation and membrane separation have been reported in, see, for example, Jennings, et al., "Conceptual Processes for Recovery of Argon with Membranes in an Air Separation Process," *American Institute of Chemical Engineers,* 1987 Summer National Meeting, and Agrawal, et al., "Membrane/-Cryogenic Hybrid Scheme for Argon Production from Air," *American Institute of Chemical Engineers,* 1988 Summer Meeting in Denver, Colo. Selectivity and recovery in such hybrid schemes has been rather poor. Much of the argon permeates with oxygen through membranes and must be recycled to crude argon distillation columns.

Another technique for removing trace amounts of oxygen and other impurities from argon has involved lithium containing organic resins. Generally, the lithium is not regenerated. The lithium converts to lithium oxide.

Therefore, there is a need in the industry for an improved process for purifying crude argon produced by cryogenic air separation.

SUMMARY OF THE INVENTION

A process and system have been invented for removing trace amounts of oxygen, as well as water, from crude inert gases. In a first stage oxygen-removal unit the crude oxygen-containing inert gas is contacted with a reactive, oxide-forming material under oxide forming conditions. The crude inert gas may emanate from a cryogenic distillation unit which produces oxygen, nitrogen and argon. Crude argon from a cryogenic unit, for example, typically contains up to 5% oxygen and up to 1% of nitrogen. Thus, the term "crude," for the purposes of this invention applies to an inert gas such as $N_2$, Ar, He, Ne and the like having minor amounts of oxygen in it, regardless of the source of the inert gas.

A crude inert gas containing oxygen and moisture, if any, may have the oxygen removed therefrom in a single stage unit. Such single stage unit generally contains a reactive material, i.e. an oxidizable material, which may be readily regenerated, preferably in situ, via use of a reducing gas, e.g. $H_2$, $NH_3$, $CH_4$ and the like. Such reducing gas is preferably produced or introduced at the point-of-use site for the purified inert gas.

This process and system is especially useful inasmuch as it may be used at the point of manufacture of the inert gas, usually by cryogenic distillation means, or used at the point-of-use site of the purified inert gas. The Semiconductor Industry, for example, requires argon gas of extreme purity. Argon may be purified at a semiconductor plant by use of the instant invention. The invention is further advantageous inasmuch as the units may be large scale units or very compact units. For example, efficient units for treating small flow rates of gas can be small enough to fit in a suitcase.

The techniques of the instant invention may be used to remove oxygen from other inert gases such as neon, helium, xenon and the like.

DETAILED DESCRIPTION OF THE INVENTION

The process and systems of this invention for removing trace amounts of oxygen from crude inert gases involves contacting said crude inert gases with an oxidizable material, e.g. metals such as copper, lead, titanium, nickel, vanadium, zirconium and alloys thereof and oxygen deficient materials such as metal suboxides, $V_2O_4$, and crystalline materials such as metal zeolites, e.g. copper zeolites and oxygen deficient perovskites, under oxidizing conditions to remove substantially all the oxygen from said inert gas. The oxidized material can be regenerated by being reduced, e.g., in-situ, by a reducing gas, particularly one produced on site by an electrochemical cell.

Figure 1:
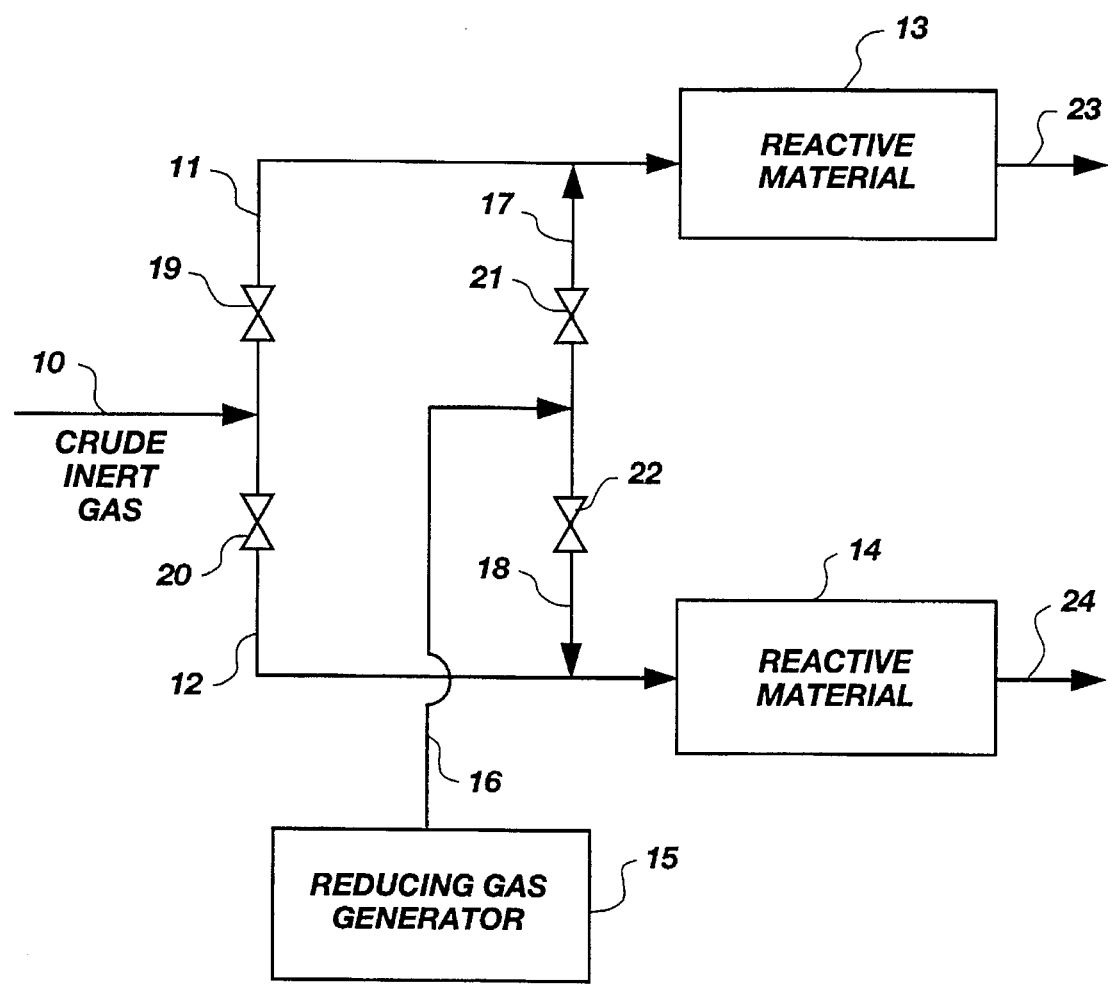
FIG. 1 is a schematic illustration of the instant invention system having two oxygen removal devices in parallel which are operated sequentially.

Further description of the invention may be facilitated by reference to FIG. 1.

FIG. 1 is a schematic representation of the process of the instant invention wherein a crude inert gas stream 10 is conducted via a pair of conduits 11 and 12 to a pair of reactors 13 and 14 which are parallel with one another so that one reactor may be removing the oxygen contaminant from the crude inert gas while the other reactor is being regenerated. A reducing gas generator 15 provides a reducing gas through conduit 16 to a pair of lines 17 and 18 which lead to each reactor. Appropriate valves 19, 20, 21 and 22 are in conduits 11, 12, 17 and 18, respectively, to control the flow of the crude inert gas and the reducing gas to the appropriate reactor.

The crude inert gas, for purposes of this invention, is any inert gas such as nitrogen, argon, helium, neon and the like containing oxygen in trace amounts in the neighborhood of about 5% or less as a contaminant. Inert gas may be mixtures of inert gases, i.e. a mixture of argon and nitrogen or the inert gas may be a single inert gas. Also, other gases may be present in the inert gas as long as that diluent gas does not interfere with the reactions occurring in the reactors 13 and 14 and is not otherwise objectionable or a contaminant for any purpose for which the inert gas in a pure form may be intended. Generally, the presence of hydrogen and other reducing gases in the crude inert gas stream would not be desirable inasmuch as such gases could interfere with the oxidation reaction taking place in the reactors in which oxygen is removed.

Figure 2:
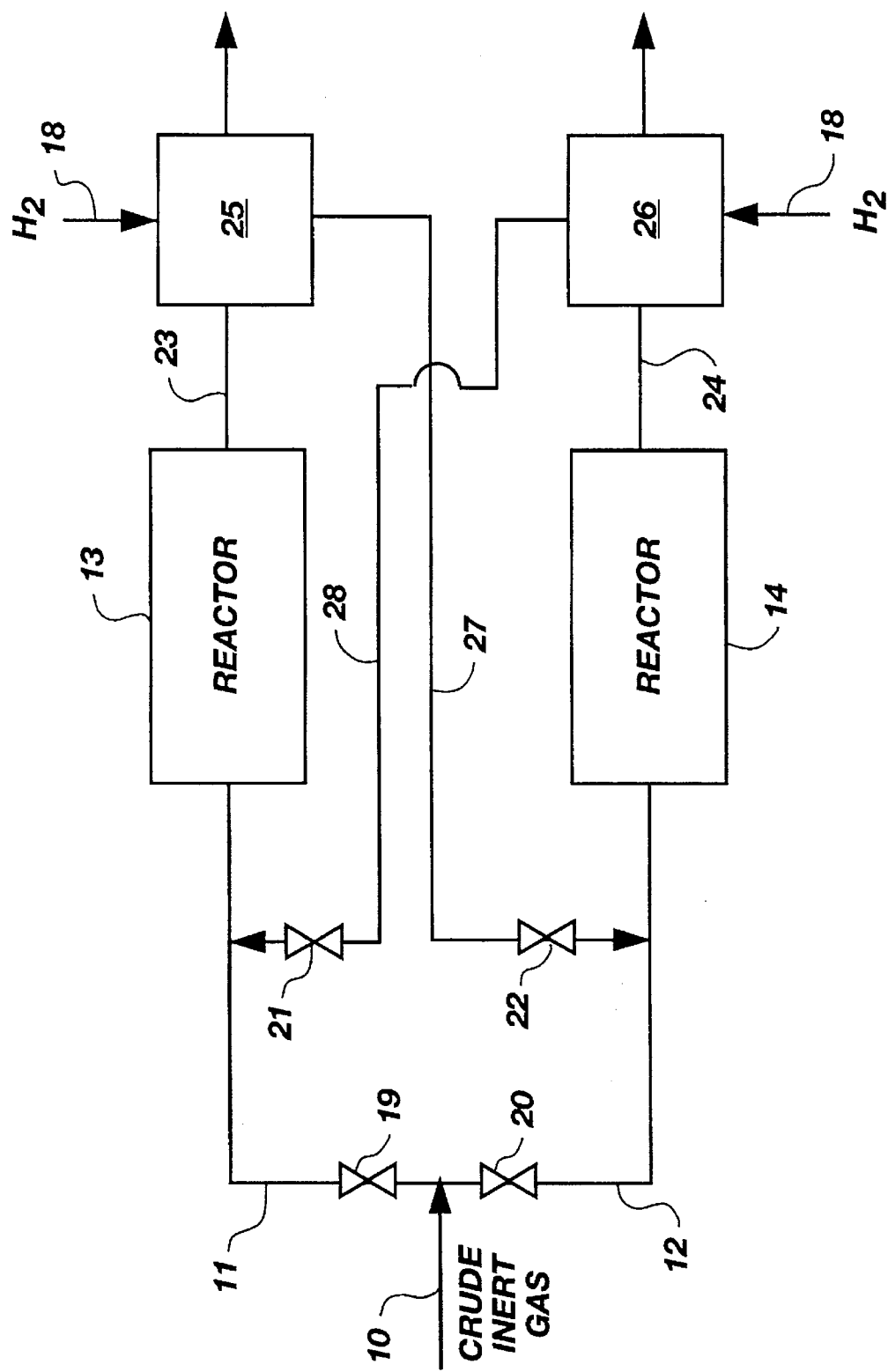
FIG. 2 is a schematic illustration of a system similar to that of FIG. 1 with a heat recuperator.

FIG. 2 illustrates an oxygen removal system wherein the hot, pure inert gas 23 exiting a particular reactor, e.g. reactor 13, is passed through a heat exchanger 25 (heat recuperator). Hydrogen gas 18 from an in-situ hydrogen generator, or methane or $NH_3$ from an appropriate source, is passed through said heat exchanger 25 to be heated before flowing through line 27 and open valve 32 into reactor 14 to regenerate (reduce) the oxidized material in reactor 14. Valves 21 and 20 are closed and valve 19 is open to introduce impure inert gas into heated reactor 13.

When it is time to regenerate reactor 13, then valves 19 and 22 are closed, and valve 20 is opened to introduce impure inert gas into reactor 14 to cause hot, pure inert gas 24 to flow through heat exchanger 26. Hydrogen is passed through exchanger 26 before being introduced into reactor 13 to reduce the oxidized material therein.

Generally, the reactors 13 and 14 contain an oxidizable, solid-state material having a high melting point preferably above 800° C. The material preferably has a very high surface area and is highly reactive with oxygen at temperatures from ambient up to about 800° C. Most of such oxidizable solid state materials are inorganic materials such as metals, metal suboxides, metal nitrides and oxidizable materials such as metal zeolites, i.e. copper zeolite and oxygen deficient perovskites.

Oxidizable metals particularly useful in the instant invention are copper, lead, titanium, nickel, vanadium, zirconium and alloys of these metals as well as mixtures of these metals. The metal may be present in the reactor in its pure metallic form or as a metal suboxide or as a metal combined with some anion other than oxygen such as nitrogen in the event that nitrogen is the principal inert gas present and the crude inert gas being purified inasmuch as release of the nitrogen from the metal would not create any contamination. If the inert gas being purified is one other than nitrogen, then use of a metal nitride in the reactor may be undesirable if nitrogen would be considered an impurity or contaminant in such inert gas.

A particularly useful oxidizable metal is vanadium including suboxides of vanadium such as $V_2O_4$ which reacts readily with oxygen to form $V_2O_5$. Thus, one mole of $V_2O_4$ would remove one-half mole oxygen. The oxidized vanadium, that is, $V_2O_5$, is readily converted by hydrogen gas back to $V_2O_4$ while producing a mole of water.

Thus, during the purification stage, the reaction proceeding in a reactor would be one in which the metal or metal suboxide or other readily oxidizable material present was oxidized, while in the regeneration stage the reverse would be taking place that is, the oxidized material formed during the purification stage would be returned to its original oxidizable state, e.g. a metal or metal suboxide. If a metal nitride were used during the purification stage, it would be necessary to use appropriate conditions to regenerate the metal oxide with nitrogen to return it to a metal nitride. In a preferred mode of the instant invention, oxidizable materials used in the reactor are those in which a reducing gas, readily produced in situ, may be utilized to reconvert the oxidized material to its oxidizable state.

For the purposes of regeneration, a reducing gas such as hydrogen, ammonia or methane, for example, may be utilized to react with oxidized material formed during the purification stage to return it to an oxidizable material, e.g. metal or metal suboxide. Hydrogen gas may be produced in situ at a point-of-use by a simple electrolytic cell which produces hydrogen and oxygen from a water electrolyte. Hydrogen from such a cell is directed to the reactors to regenerate the metal oxide present in the reactors.

During the purification stage, pure inert gas would flow from lines 23 and 24 depending upon which reactor was being used to purify the inert gas. During the regeneration stage, water would emanate from lines 23 or 24, again depending upon which reactor was being regenerated.

In the event the reducing gas generator is a simple electrolytic cell using water as a electrolyte, it is preferred that the hydrogen produced be passed through a dryer to remove any entrained water before the hydrogen is conducted to the reactor to regenerate the oxidized material in the reactor. An advantage of using hydrogen as a reducing gas to regenerate the oxidized material to an oxidizable material state is that only water is produced as a byproduct. Also, hydrogen is readily produced by various types of electrolytic and electrochemical cells to provide a pure stream of hydrogen for reducing purposes. Also, no toxic or other difficult to handle gases or liquids are produced in such an electrolytic cell. When water is the electrolyte, only oxygen is produced as a byproduct gas. Such pure oxygen may be vented or recovered for some purpose.

Ammonia and methane, for example, may be used as reducing gases. In the event ammonia is used as a reducing gas, the hydrogen of the ammonia would react with oxygen in the oxidized material to form water, while nitrogen would also exist as a byproduct of the regeneration step. If $CH_4$ (methane) is used as a reducing gas, then $CO$, $CO_2$ and water would be formed during the regeneration stage. None of these reaction products are detrimental to the oxidizable metal and are not particularly toxic.

Methane is readily available in most cites as natural gas so that an on-site regeneration of the reactors is quite feasible with methane. Ammonia is readily available from most chemical supply companies and, also, can be produced on site in a mini ammonia reactor. Such ammonia minireactors include systems for dissociating ammonium hydroxide, which is readily available commercially and is relatively safe to handle. Ammonium hydroxide can be electrolyzed to release $NH_3$ gas.

A purification system employing the instant invention is especially useful for on-site applications wherein a crude inert gas is readily available containing small amounts of oxygen, but because of the purpose to which the inert gas is put, the crude inert gas is not sufficiently pure. Such oxygen impurity may be then removed on site. Also, another advantage is that if the crude gas is used in any processing plant in which it picks-up oxygen during its use, it may be recycled and the oxygen removed so that the inert gas does not have to be vented, but can be recovered, again purified and reused in pure, uncontaminated form.

EXAMPLE

An apparatus for purifying 50,000 cfh of impulse argon consists of a pair of reactors and an electrolytic gas generating unit. At an oxygen level of 5% by volume, about 2500 cfh of $O_2$ must be removed from the crude inert gas. This is equivalent to about 7 lb moles of $O_2$.

Each reactor must be charged with at least about 14 lb moles of $V_2O_4$ which acts as the oxygen-removal agent. The purification reaction is as follows:

$$7O_2 + 14V_2O_4 \rightarrow 14V_2O_5$$

The molecular weight of $V_2O_4$ is about 115. Therefore, about 1500 lbs of $V_2O_4$ is required to remove 2500 cfh of $O_2$, assuming that 100% of the $V_2O_4$ is converted to $V_2O_5$.

Since its desired to have the purified inert gas contain about zero percent oxygen, it's preferred to have an excess of the oxidizable material present. Therefore, having twice the stoichiometric amount of oxidizable material in a purification reactor is generally preferred.

A pair of reactors is preferred for technological reasons. Continuous purification can be accomplished by alternating purification and regeneration. More importantly, conservation of energy can be accomplished with two reactors.

The oxidation (purification) reaction is exothermic; the regeneration (reduction) reaction is endothermic. Purification preferably takes place at about ambient to about 1500° F. and preferably from about 500° F. to about 1400° F. The purified inert gas thus departs a reactor at a temperature within this range.

The hot pure inert gas is directed to a heat exchanger (recuperator) (see FIG. 2). The reducing gas, preferably hydrogen, is directed to the heat exchanger to picks up energy before entering the reactor to regenerate the oxidized material, e.g. $V_2O_5$.

The reduction reaction is as follows:

$$7H_2 + 14V_2O_5 \rightarrow 14V_2O_4 + 7H_2O$$

Therefore, 2500 cfh of $H_2$ is required stoichiometrically to reduce the oxidized material. Excess $H_2$ is typically used to convert all the oxidized material to its oxidizable state.

The reduction reaction is preferably conducted at a temperature of about 500° F. to about 1500° F. The hydrogen departs the heat exchanger (recuperator) at a temperature of about 300° F. to about 1500° F.

After a reactor is regenerated, it contains a hydrogen atmosphere. For safety reasons, no oxygen containing gas should be introduced to such hot regenerated reactor. Thus, pure inert gas is introduced to the regenerated reactor for a sufficient time to purge the hydrogen from it. The purging should continue until there is virtually no hydrogen in the purge gas exiting the reactor. A hydrogen detector analyzer may be utilized to detect $H_2$ in the purge gas. Typically, the purge gas is introduced in total quantity equal to five to ten times the volume of the reactor.

As indicated above, approximately 3000 lbs of $V_2O_4$ may be used. A highly porous bed of oxidizable material is desired so that a large surface area of $V_2O_4$ is exposed and minimal resistance is presented to gas flow through the reactor. Generally, the oxidizable material is a surface layer upon a carrier material such as alumina, silica, titania or the like. Given that the weight of the carrier may be equal to or greater than the $V_2O_4$, the volume necessary, assuming a bulk density of about 30 lbs/ft³ (Sp.G. of 0.5) for a coated porous carrier, for the reactor is about 200 ft³. A reactor with a diameter of about 6 feet and a height of about 7 feet is satisfactory. The reactor may contain a static bed of oxidizable material or it may be a fluid bed.

An electrolytic cell charged with water and a mild acid, such as acetic acid, is closely associated with the inert gas purifier. The cell generates $H_2$ and $O_2$. The $H_2$ is fed to a spent reactor to regenerate it.

In the system described in the Example, 7 lb moles of $H_2$ are required stoichiometrically to regenerate the oxidized material in a reactor. This requires 7 lb moles (22 lbs) of water to be decomposed. Typically, excess hydrogen will be utilized to accomplish complete reduction. Thus, in excess of 122 lbs per hour of water will generally be hydrolyzed.

Copper metal may be substituted for $V_2O_4$ in the above example to obtain similar results.

The oxidation reaction is:

$$Cu + O_2 \rightarrow CuO_2$$

The reduction reaction is:

$$CuO_2 + 2H_2 \rightarrow Cu + 2H_2O$$

The substitution of other metals, metal suboxides, metal zeolites or oxygen deficient perovskites may be substituted for $V_2O_4$ in the above example with similar results being obtained.

Other hydrogen generator cells may be readily utilized. Examples of such cells include steam hydrolyzers which place steam ($H_2O$) in contact with an electrode made of yttria stabilized zirconia electrolyte under influence of a D.C. voltage at elevated temperature wherein the steam hydrolyzes, with oxygen ions being transported through said electrolyte to an anode in contact with said electrolyte and hydrogen being released at the cathode in contact with said steam. Hydrogen and water vapor are recovered from the cathode chamber, the mixture dried and hydrogen recovered for use as a reducing agent.

Various other electrolytic units may be utilized. Hydrogen may be generated using a Nafion membrane, i.e. a PTFE polymer membrane which transports cations, such as $H^+$ in an acid electrolyte. Such membranes are typically permeable to water. Thus, on one side of the membrane is water or dilute acid; on the other side is a stronger acid. The membrane is coated with electrodes to act as an anode and cathode. Under the influence of a D.C. voltage potential hydrogen ions migrate through the membrane to the cathode, to be released as hydrogen gas. Oxygen may be released at the cathode.

Other types of self-contained hydrogen generators may be utilized. For example, a Nasicon ceramic ($Na_{1+x}Zr_2P_{3-x}Si_xO_{12}$) wherein x has a value of zero to three, may be used as an electrolyte in a NaOH solution. The ceramic, coated on one side with an anode such as $Ti_4O_7$ and a cathode such as Ni, functions under influence of a D.C. voltage potential to transport $Na^+$ ions from the anolyte to the catholyte. The sodium ions react with water in the catholyte to form NaOH, thereby increasing the concentration of NaOH, while releasing hydrogen. The hydroxyl ions formed from NaOH when the sodium ion is removed from water and oxygen at the anode. Thus, the catholyte becomes more concentrated NaOH and the anolyte becomes more dilute NaOH.

Electrolytic cells having an anode (oxygen releasing electrode) made of $RuO_2$ coated titanium, Pt coated titanium and $Ti_4O_7$ work very effectively. Also, hydrogen releasing electrodes (cathodes) made from or coated can be with $RuO_2$ coated titanium and nickel. These electrodes work well with simple hydrolysis cells or with Nafion membrane cells.

Hydrolysis cells of a conventional type as a Nafion membrane type may work effectively with a weak acid electrolyte such as acetic acid.

What is claimed is:

1. A method of removing $O_2$ from a crude inert gas comprising:

contacting said $O_2$ containing inert gas with a material consisting essentially of an inorganic oxidizable material under oxidizing conditions to react said $O_2$ with said oxidizable material to produce an $O_2$-free inert gas and an oxidized material, said crude inert gas having $O_2$ concentration up to about 5%;

recovering said $O_2$-free inert gas; and contacting said oxidized material with a reducing gas under reducing conditions at temperatures in excess of about 300° C. to convert said oxidized material to said oxidizable material.

2. The method of claim 1 wherein said reducing gas is hydrogen.

3. The method of claim 2 wherein said hydrogen is generated electrolytically.

4. The method of claim 1 wherein said oxidizable material is a metal selected from the class consisting of copper, lead, iron, titanium, nickel, vanadium, zirconium and alloys of said metals.

5. The method of claim 1 wherein said oxidizable material consists of metal zeolites, oxygen deficient perovskites and oxygen deficient metal oxides.

6. The method of claim 1 wherein said $O_2$ containing inert gas is contacted with an oxidizable material at a temperature of about ambient to about 800° C.

7. The method of claim 1 wherein said oxidized material is contacted with a reducing gas at a temperature of about 300° C. to about 1500° C.

8. The method of claim 7 wherein said oxidizable material is carried upon the surface of a non-oxidizable carrier with an extended surface area.

9. The method of claim 8 wherein said carrier is alumina, titania, zeolite or silica.

10. The method of claim 1 wherein said oxidizable material has an extended surface area.

11. The method of claim 1 wherein said oxidizable material exists in two zones, a first zone in which oxidizable material is contacted with said $O_2$ containing crude inert gas and a second zone in which said oxidized material is contacted with a reducing gas to convert said oxidized material to an oxidizable material.

12. The method of claim 1 wherein said reducing gas is hydrogen, ammonia or methane.

13. The method of claim 1 wherein said inert gas substantially free of oxygen is dried to remove $H_2O$.

14. The method of claim 1 wherein said inert gas is one selected from the class consisting of $N_2$, Ar, He, Ne and Xe.

15. The method of claim 1, wherein said oxidizable material is a suboxide of vanerdium.

\* \* \* \* \*

UNITED STATES PATENT AND TRADEMARK OFFICE
CERTIFICATE OF CORRECTION

PATENT NO. : 5,607,572
DATED : March 4, 1997
INVENTOR(S) : Joshi

It is certified that error appears in the above-identified patent and that said Letters Patent is hereby corrected as shown below:

In Column 7, line 53, after "(cathodes)" insert --can be--; after "coated" delete "can be".

Signed and Sealed this

Nineteenth Day of May, 1998

Attest:

BRUCE LEHMAN

Attesting Officer

Commissioner of Patents and Trademarks